(12) United States Patent
Endou

(10) Patent No.: US 7,959,218 B2
(45) Date of Patent: Jun. 14, 2011

(54) TILT LOCK STRUCTURE OF DRIVER'S CABIN

(75) Inventor: Takeshi Endou, Kawagoe (JP)

(73) Assignees: Komatsu Ltd., Tokyo (JP); Komatsu Utility Co., Ltd, Tokyo (JP)

( * ) Notice: Subject to any disclaimer, the term of this patent is extended or adjusted under 35 U.S.C. 154(b) by 0 days.

(21) Appl. No.: 12/421,211

(22) Filed: Apr. 9, 2009

(65) Prior Publication Data
US 2009/0250972 A1 Oct. 8, 2009

Related U.S. Application Data

(63) Continuation-in-part of application No. 12/040,341, filed on Feb. 29, 2008, now abandoned.

(51) Int. Cl.
*B60J 7/00* (2006.01)
(52) U.S. Cl. ............... 296/190.06; 296/190.04
(58) Field of Classification Search ............ 296/190.04, 296/190.05, 190.06; 180/89.14, 89.15, 89.17, 180/89.18, 89.13
See application file for complete search history.

(56) References Cited

U.S. PATENT DOCUMENTS

| 6,910,731 B2 * | 6/2005 | Albright et al. | 296/190.05 |
| 7,338,114 B2 * | 3/2008 | Ishii et al. | 296/190.05 |
| 7,607,721 B2 * | 10/2009 | Grimes et al. | 296/190.01 |

FOREIGN PATENT DOCUMENTS
JP 10-086859 A 4/1998

OTHER PUBLICATIONS
Non-final Office Action mailed Mar. 3, 2010 for U.S. Appl. No. 12/040,341, 8 pages.

* cited by examiner

*Primary Examiner* — Joseph D Pape
(74) *Attorney, Agent, or Firm* — Fish & Richardson P.C.

(57) ABSTRACT

A first engaging hole and a second engaging hole are formed in a fan-shaped standing portion which is fixed to a vehicle body frame and concentrically constructed with respect to a tilt direction of a the driver's cabin with a hinge shaft as a center of tilting. The first and second engaging holes respectively correspond to a tilt down position and a tilt up position of the driver's cabin. The standing portion is inserted into an actuating member fixed to a driver's cabin frame, and a locking pin urged by a spring is slidably disposed to the actuating member. Since the locking pin slides on a surface of the standing portion, the locking pin can be automatically engaged with the first or second engaging hole.

8 Claims, 8 Drawing Sheets

TILT LOCK STRUCTURE OF DRIVER'S CABIN

CROSS REFERENCE TO RELATED APPLICATIONS

This application claims priority under 35 U.S.C. §120 to U.S. application Ser. No. 12/040,341 filed on Feb. 29, 2008. The entire contents of this application is hereby incorporated by reference.

BACKGROUND OF THE INVENTION

1. Field of the Invention

The present invention relates to a tilt lock structure of a tiltable driver's cabin for used in a work vehicle.

2. Description of the Related Art

Conventionally, there is known a work vehicle having a driver's cabin constituted tiltable, the driver's cabin being also called a cab, a canopy, a cabin, and the like. With this constitution, when the tiltable driver's cabin is tilted up, since a working space around an engine disposed below the driver's cabin can be released, a maintenance and check job to the engine and the like can be easily performed.

The driver's cabin, which is tilted up or down, has a heavy weight due to various devices and the like disposed therein. Accordingly, a cylinder unit such as a gas spring and the like is interposed between the driver's cabin and a vehicle body frame so that a tilt operation can be performed to the driver's cabin by the extending and contracting action of the cylinder unit. Otherwise, the tilt operation can be manually performed to the driver's cabin using the extending/contracting action of the cylinder unit as an auxiliary power.

In this type of the constitution capable of tilting the driver's cabin, a driver's cabin lowering motion prevention device is added to prevent a danger that the driver's cabin is lowered when the cylinder unit fails, and the like. An ordinary driver's cabin lowering motion prevention device includes a constitution for preventing the contraction of an extended piston rod by inserting a stopper pin into a through hole formed to the piston rod, a constitution for preventing the contraction of an extended piston rod by disposing brackets to the outer periphery of a cylinder tube and to the front end side of the piston rod and interposing a stopper member between both the brackets (refer to Japanese Patent Application Laid-Open (JP-A) No. 10-86859) and the like.

However, in these lowering motion prevention devices, the stopper pin must be inserted or the stopper member must be interposed between the brackets after the piston rod of the cylinder unit is extended. Further, since these lowering motion prevention devices are disposed to a side lower portion of a driver's cabin, when, for example, a driver manually tilts up the driver's cabin from a front side of the driver's cabin, the driver must go to a side portion of the driver's cabin and operate the lowering motion prevention device.

Moreover, each time a worker confirms whether or not the lowering motion prevention device is operated, the driver must go to the side portion of the driver's cabin for the confirmation. Accordingly, when the worker wants to confirm the operating state of the lowering motion prevention device while he or she performs the maintenance and check of the engine and the like, he or she must interrupt the maintenance and check job once.

SUMMARY OF THE INVENTION

An object of the present invention is to provide a tilt lock structure of a driver's cabin which can function in place of the lowering motion prevention device disposed to the side portion of the conventional driver's cabin described above and moreover can automatically lock the driver's cabin at the position where it is tilted up and down. Further, an object of the present invention is to provide a tilt lock structure of a driver's cabin which can be also disposed to a front lower portion of the driver's cabin.

The objects of the present invention can be achieved by the respective aspects of the present invention described below.

More specifically, a tilt lock structure of a driver's cabin of the present invention comprises an engaging member standing on a vehicle body frame or a driver's cabin frame, and an actuating member fixed to the driver's cabin frame or the vehicle body frame and engaged with the engaging member.

The engaging member includes a standing portion which is formed in a concentric fan-shape with respect to a tilt direction of the driver's cabin and has at least one engaging hole formed thereto so as to correspond to a tilt position of the driver's cabin, and a stopper piece disposed to the vicinity of the engaging hole to lock a locking claw of the at least one actuating member.

The actuating member includes a locking pin having one end engaged with the engaging hole and the other end having a lever, a locking claw fixed to the locking pin, a spring for urging the locking pin to the standing portion side, and a locking portion to which and from which the locking claw is locked and unlocked.

The locking claw can be locked to and unlocked from the locking portion by axially turning the locking pin in a state that the locking pin is engaged with the engaging hole. The locking claw can be locked to and unlocked from the stopper piece by axially turning the locking pin when the locking pin is disengaged from the engaging hole as well as the locking claw is unlocked from the locking portion.

Further, a tilt lock structure of a driver's cabin of the present invention is a tiltable driver's cabin mounted on a work vehicle and comprises an engaging member standing on a vehicle body frame or a driver's cabin frame and an actuating member fixed to the driver's cabin frame or the vehicle body frame and engaged with the engaging member.

The engaging member includes a standing portion and a stopper piece, and the standing portion which is formed in a concentric fan-shape with respect to a tilt direction of the driver's cabin and has a first engaging hole formed thereto so as to correspond to a tilt down position of the driver's cabin and a second engaging hole formed thereto so as to correspond to a tilt up position of the driver's cabin. Further, the stopper piece is constructed as a member for locking a locking claw of the actuating member.

The actuating member includes a locking pin, a locking claw, a spring, and a locking portion. The locking pin has one end which can be selectively engaged with the first engaging hole or the second engaging hole. The other end of the locking pin has a lever which axially turns the locking pin and causes the locking pin urged to the standing portion by the spring to slide in the axial direction thereof.

The locking claw is fixed to the locking pin. The locking claw can be locked to and unlocked from the locking portion by axially turning the locking pin in a state that the locking pin is engaged with the first engaging hole or the second engaging hole.

Further, the locking claw can be locked to and unlocked from the stopper piece by axially turning the locking pin when the locking pin is disengaged from the first engaging hole or the second engaging hole as well as the locking claw is unlocked from the locking portion.

The tilt lock structure of the driver's cabin can be constituted as described above.

In the tilt lock structure of the driver's cabin of the present invention, the locking claw may be automatically unlocked from the stopper piece when the driver's cabin tilts a predetermined angle or more.

Further, in the tilt lock structure of the driver's cabin of the present invention, a skid-steer may be used as the work vehicle, and the tilt lock structure may be disposed to a front lower portion of the driver's cabin.

In the present invention, the movement of the driver's cabin in the tilt direction can be locked at the position at which the driver's cabin is tilted up or down by the engaging member, which stands on the vehicle body frame or the driver's cabin frame, and the actuating member fixed to the driver's cabin frame or the vehicle body frame. Moreover, the driver's cabin can be simply released from a locked state by manipulating the lever disposed to the other end of the locking pin.

Then, the driver's cabin can be automatically shifted to the locked state by sliding the one end of the locking pin urged by the spring on a surface of the standing portion of the engaging member as the driver's cabin is tilted up or down. That is, when the actuating member fixed to the driver's cabin frame is moved as the driver's cabin is tilted up or down, the one end of the locking pin urged by the spring can be also moved while sliding on the surface of the standing portion.

When the driver's cabin reaches the tilt down or up position, the one end of the locking pin is automatically inserted into the engaging hole, the first engaging hole, or the second engaging hole formed to the standing portion. When the locking claw is locked to the locking portion by turning the lever in the state that the one end of the locking pin is engaged with the engaging hole or the first engaging hole, the state that the one end of the locking pin is engaged with the engaging hole or the first engaging hole can be maintained.

When the locking claw is locked to the locking portion by turning the lever in the state that the one end of the locking pin is engaged with the engaging hole or the second engaging hole, the state that the one end of the locking pin is engaged with the engaging hole or the second engaging hole can be maintained.

When the lever is pulled in the axial direction of the locking pin against the urging force of the spring after the locking claw is unlocked from the locking portion by turning the lever in the state that the one end of the locking pin is engaged with the engaging hole, the first engaging hole, or the second engaging holes, the one end of the locking pin can be disengaged from the engaging hole, the first engaging hole, or the second engaging hole. When the lever is turned in the state that the one end of the locking pin is disengaged from the engaging hole or the first engaging hole, the locking claw can be locked to the stopper piece.

In the present invention, the height of the stopper piece can be set such that when the driver's cabin is tilted up to a predetermined angle or more, the locking claw is unlocked from the stopper piece. With this constitution, when the driver's cabin is tilted up to the predetermined angle or more, the locking claw is automatically unlocked from the stopper piece by the urging force of the spring.

After the locking claw is unlocked from the stopper piece, the one end of the locking pin, which is urged by the spring, moves toward the engaging hole or the second engaging hole while sliding on the surface of the standing portion as the driver's cabin is tilted up. When the driver's cabin reaches the tilt up position, the one end of the locking pin is automatically inserted into the engaging hole or the second engaging hole by the urging force of the spring.

The tilt lock structure of the driver's cabin of the present invention can be also preferably applied to the skid-steer. In this case, the tilt lock structure of the driver's cabin of the present invention can be disposed to a front lower portion of a driver's cabin (also called a cab, a cabin, and the like) of the skid-steer. Moreover, in the driver's cabin of the skid-steer, since a tilt fulcrum is generally disposed to a front lower end of the driver's cabin, the tilt lock structure of the driver's cabin of the present invention can be disposed to the vicinity of the tilt fulcrum.

With this constitution, a driver can perform a job for confirming whether or not the tilt lock structure of the driver's cabin is locked only by shifting a visual axis to the tilt lock structure while performing a check job and the like in a lower portion of the tilted up driver's cabin.

DESCRIPTION OF THE PREFERRED EMBODIMENTS

A preferable embodiment of the present invention will be specifically explained below based on the accompanying drawings. A constitution, in which a work vehicle of the present invention is applied to a skid-steer loader, will be explained. However, any constitution of shape and layout, which can solve the problems of the present invention, may be also employed in addition to the constitution explained below. Accordingly, the present invention is not limited to the embodiment explained below and can be variously modified.

Embodiment

Figure 1:
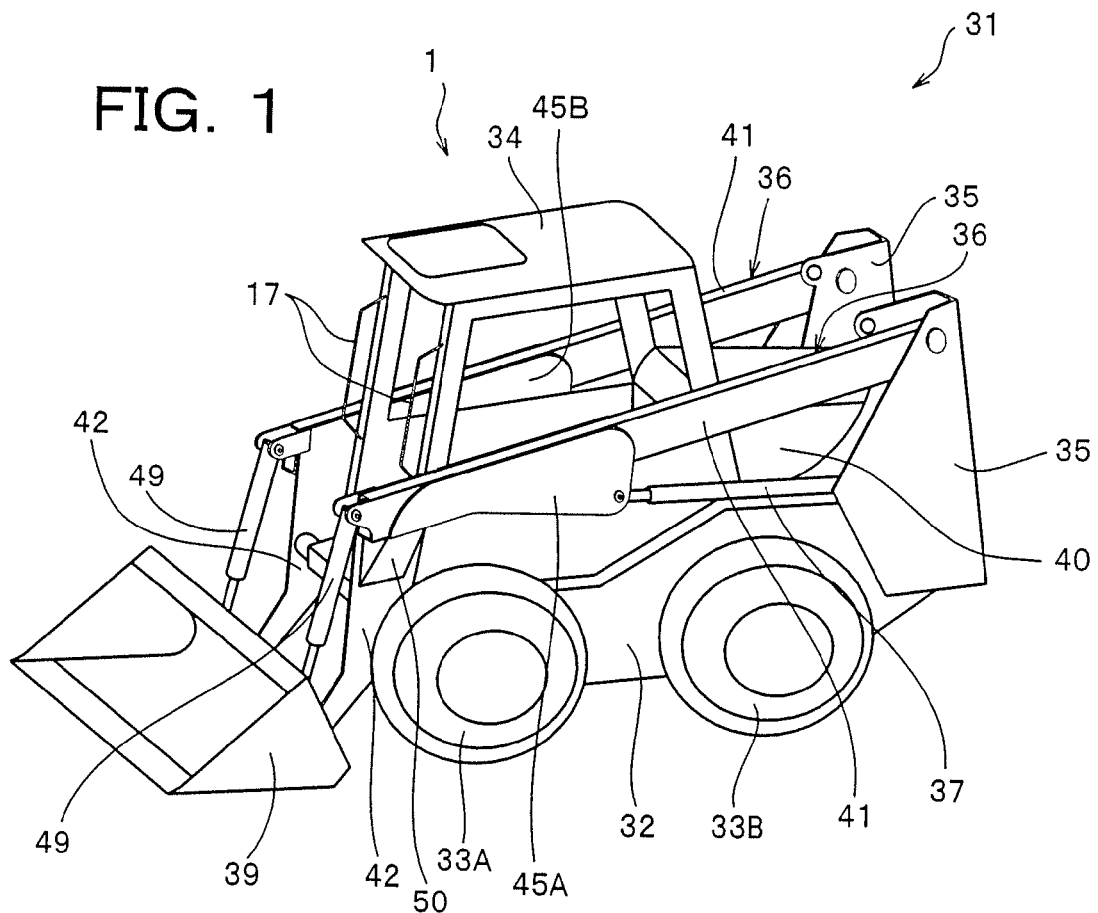
FIG. 1 is a perspective view of a skid-steer loader when it is viewed from a side surface.
Figure 2:
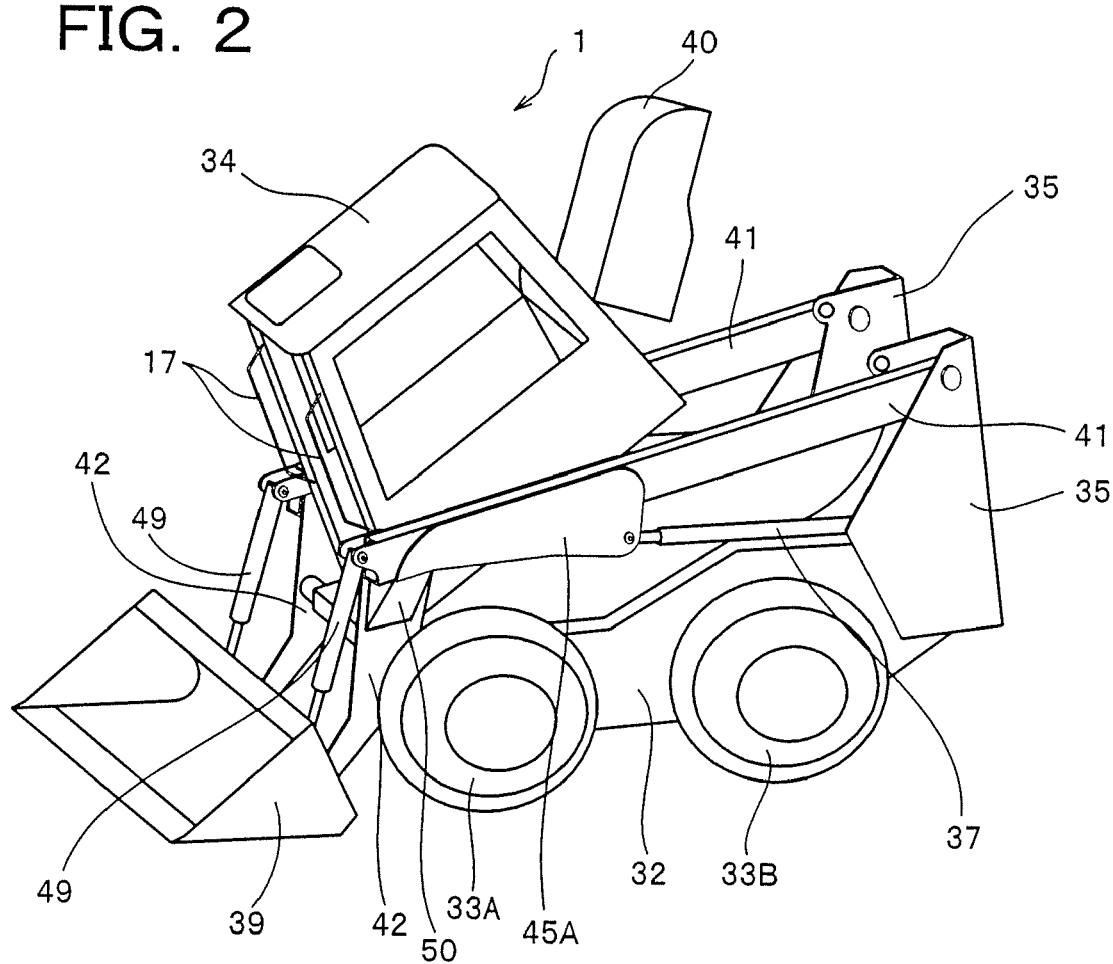
FIG. 2 is a perspective view of the skid-steer loader with a driver's cabin in a tilted-up state when it is viewed from a side surface.

As shown in FIGS. 1 and 2, the skid-steer loader 31 is constituted by including, for example, a loader main body 32, a pair of right and left front wheels 33A, a pair of right and left rear wheels 33B, a driver's cabin 1, the lift arms 36, a pair of support portions 35 for rotatably supporting the lift arms 36, arm cylinders 37, a bucket 39, work machine cylinders 49 for rotating the bucket 39, and the like. The lift arm 36 comprises a first arm portion 41 and a second arm portion 42. The bucket 39 is pivoted at a front end portion of the second arm portion 42 so as to swing freely.

The loader main body 32 constitutes a vehicle body of the skid-steer loader 31, and the pair of right and left front wheels 33A is disposed to a front side of the loader main body 32 so that they can be independently driven in rotation, respective. The pair of right and left rear wheels 33B is disposed to a rear side of the loader main body 32 so that they can be independently driven in rotation, respectively. The attitude of the loader main body 32 can be controlled by changing the number of rotations of the right and left front and rear wheels 33A, 33B, thereby the loader main body 32 can travel forward and rearward as well as perform a spin turn and the like. The number of rotations of the front and rear wheels 33A, 33B can be controlled by a not shown manipulation lever disposed to the driver's cabin 1.

The driver's cabin 1 is located at a position near to a front side of the loader main body 32 and mounted to an upper portion of the loader main body 32. The driver's cabin 1 is covered with a not shown net guard on the three surfaces thereof excluding a front surface (both right and left surfaces and a rear surface). An operator can climb in and climb out from the driver's cabin 1 through the open front surface of the driver's cabin 1. Further, a ceiling surface of the driver's cabin 1 is at least partly constituted from a lattice-shaped ceiling portion 34. Note that it is not necessary to cover all the three surfaces of the driver's cabin 1 excluding the front surface with the net guard, and the driver's cabin 1 may be constituted otherwise as long as the side fields of view and the rear field of view can be secured as well as the operator can climb in and climb out from the driver's cabin 1.

An engine or the like which is not shown in the drawings is stored in an engine cover 40 at a rear portion of the loader main body 32. The engine cover 40 is mounted so as to rotate freely with respect to a rear portion of the driver's cabin 1 with an upper end edge of the engine cover 40 on a driver's cabin side as a rotational center. The engine cover 40 can be tilted up and down in accordance with the tilting up and down of the driver's cabin 1.

FIG. 2 shows the state in which the driver's cabin 1 and the engine cover 40 tilted down in FIG. 1 is tilted up by rotating them in a counterclockwise direction as seen in the drawing.

Note that members, an engine or the like disposed under the tilted-up driver's cabin 1 and engine cover 40 are omitted.

As shown in FIG. 2, when the driver's cabin 1 is tilted up, the engine cover 40 is tilted up as well, thereby enabling a repair and maintenance of the engine or the like stored in the engine cover 40. In addition, even in a state in which the driver's cabin 1 is tilted down, the engine cover 40 can be rotated independently from the driver's cabin 1. Even in this state, the repair and the maintenance of the engine or the like stored in the engine cover 40 is possible.

Figure 3:
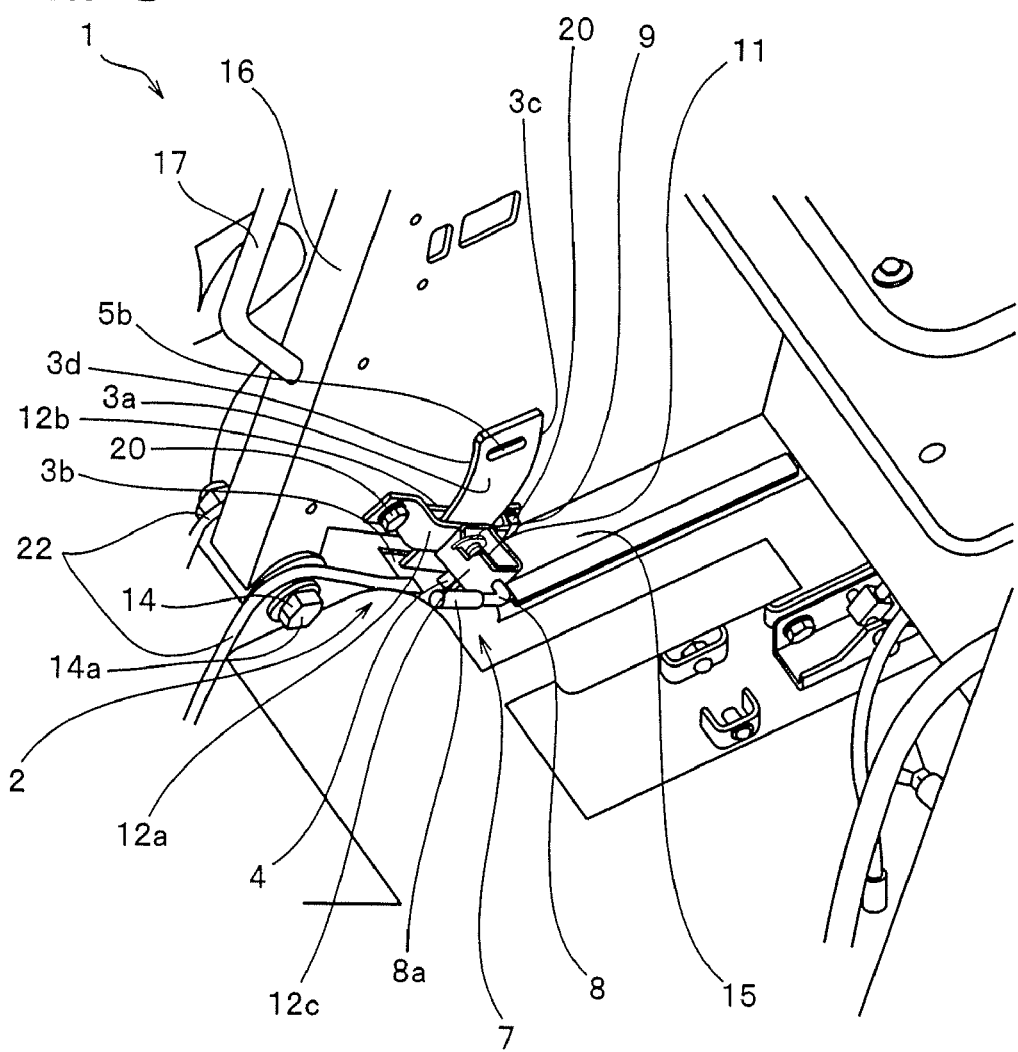
FIG. 3 is a perspective view showing a main portion of a driver's cabin in a lower portion thereof.

Next, features in a lower portion of the driver's cabin 1 are explained hereinafter with reference to FIG. 3. In FIG. 3, a part of a floor in the driver's cabin 1 is removed which acts as a space on which a driver places his or her foot when he or she enters and leave the driver's cabin 1 from a front face side of the driver's cabin 1. The removed floor can be detachably mounted on a driver's cabin frame 16 of the driver's cabin 1 through bolts and the like and is constituted as a member for covering a tilt lock structure of the driver's cabin to be described later.

Each of both the front lower end portions of the driver's cabin 1 is tiltably supported through a hinge shaft 14 between a pair of flanges 22 attached to the vehicle body frame 15. Further, a gas spring (not shown) is disposed on a lower surface of the driver's cabin 1, and used as an auxiliary driving force when the driver's cabin 1 is tilted up about the hinge shafts 14.

The tilt lock structure of the driver's cabin 1 is constituted from an engaging member 2 attached to the vehicle body frame 15 and an actuating member 7 attached to the driver's cabin frame 16 of the driver's cabin 1. The constitution of the engaging member 2 will be explained using FIGS. 4 and 5, and the constitution of the actuating member 7 will be explained using FIGS. 6 and 7. Positional relations between an engaging member 2 and an actuating member 7 at positions where the driver's cabin 1 is tilted up and down, respectively, are explained by using FIGS. 8A to 10B.

Figure 4:
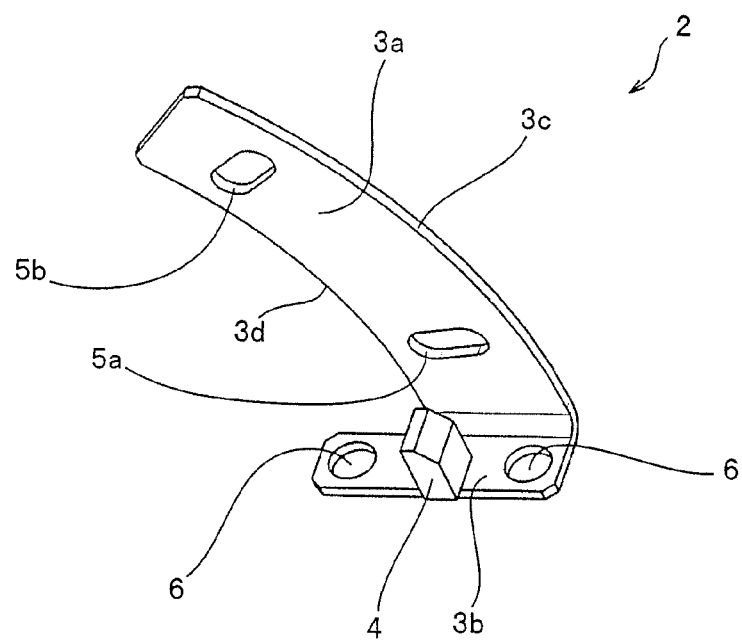
FIG. 4 is a perspective view of an engaging member.
Figure 5:
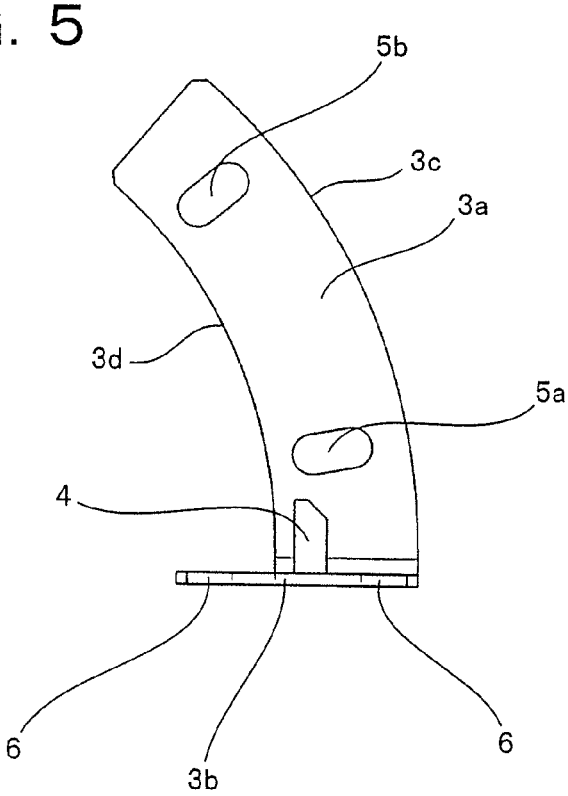
FIG. 5 is a side elevational view of the engaging member.

As shown in FIGS. 4 and 5, the engaging member 2 includes a fixing portion 3b having attachment holes 6 formed thereto so that the engaging member 2 is fixed to the vehicle body frame 15 by bolts and the like, a fan-shaped standing portion 3a formed to an arc-shape having a center at which the hinge shaft 14 standing from the fixing portion 3b is located, and a stopper piece 4 standing from the fixing portion 3b.

Especially, as shown in FIG. 9, arc shapes defined with an outer side edge 3c and an inner side edge 3d of the standing portion 3a are formed in arc shapes having radii R1 and R2 with a central axis 14a of the hinge shaft 14, respectively. Moreover, a locking pin 8 of the actuating member 7 described later moves in an arc-shaped trajectory having a radius R3 with the central axis 14a according to the tilting up and down of the driver's cabin 1.

Further, the standing portion 3a is formed with a first engaging hole 5a corresponding to a position to which the driver's cabin 1 is tilted down, and a second engaging hole 5b corresponding to a position to which the driver's cabin 1 is tilted up.

Figure 6:
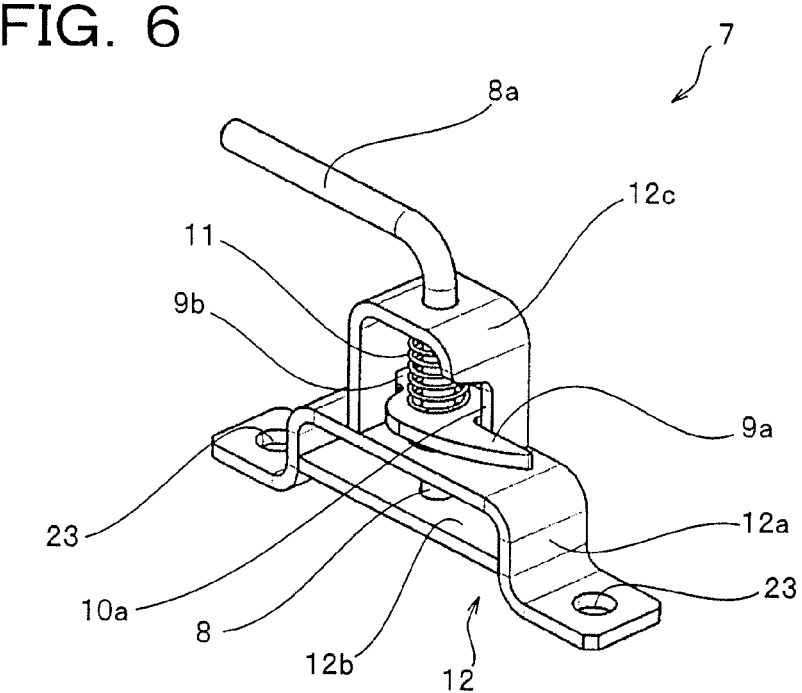
FIG. 6 is a perspective view of a main portion an actuating member.
Figure 7:
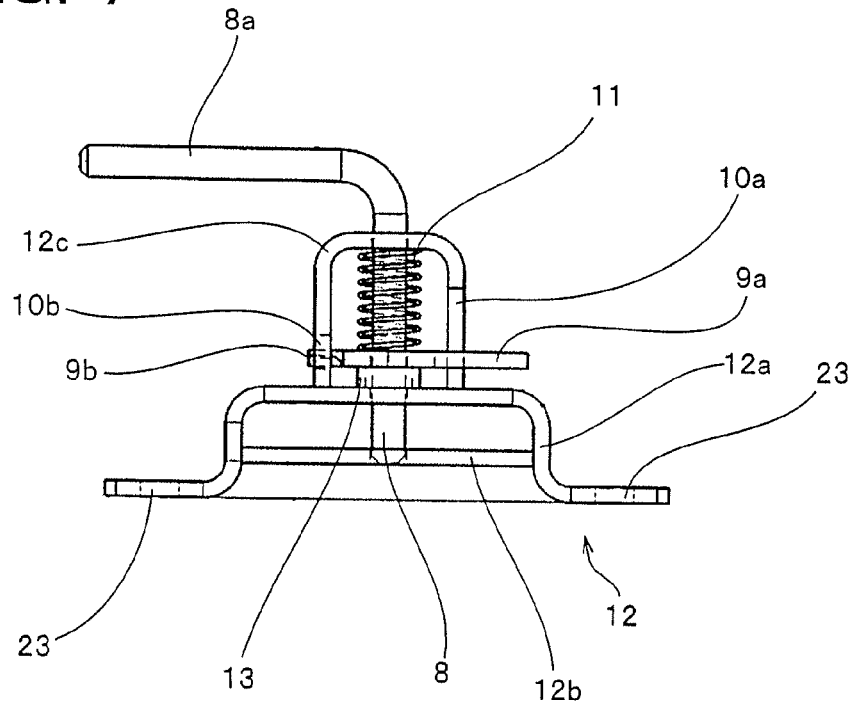
FIG. 7 is a side elevational view of the actuating member.

As shown in FIGS. 6 and 7, the actuating member 7 includes a main body 12, a locking pin 8 disposed in the main body 12a, a spring 11 for urging the locking pin 8, and a first locking claw 9a and a second locking claw 9b fixed to the locking pin 8. A locking claw is constituted from the first and second locking claws 9a, 9b. The main body 12 has attachment holes 23 formed to both the ends thereof so that the main body 12 is fixed to the driver's cabin frame 16 by bolts and the like. The main body 12 is constituted from a first member 12a having an approximately a π-shaped sectional shape, a second flat member 12b fixed between parallel side walls of the first member 12a, and a third member 12c standing on the first member 12a and having an inverted-U-shaped cross section.

The locking pin 8 is formed in an approximately L-shape and urged by the urging force of the spring 11 interposed between the third member 12c and the first and second locking claws 9a, 9b so that one end thereof is abutted against a recessed portion formed to the second member 12b. A lever 8a is constituted to the other end of the locking pin 8. Further, the first member 12a and the second member 12b have through holes formed thereto so that one end of the locking pin 8 is linearly slid therethrough.

A spacer 13 is interposed between the first and second locking claws 9a, 9b and the first member 12a to smoothly turn the locking pin 8 as well as to prevent the sliding contact between the first locking claw 9a and the first member 12a.

A first locking portion 10a is formed to the third member 12c to cause the first locking claw 9a to engage with and to disengage from the locking pin 8 when it is axially turned by turning the lever 8a. The illustrated example shows a second locking portion 10b with and from which the second locking claw 9b is engaged and disengaged when the locking pin 8 is axially turned by turning the lever 8a, while when the first locking portion 10a is formed, the second locking portion 10b and the second locking claw 9b are not always necessary.

Figure 9A:
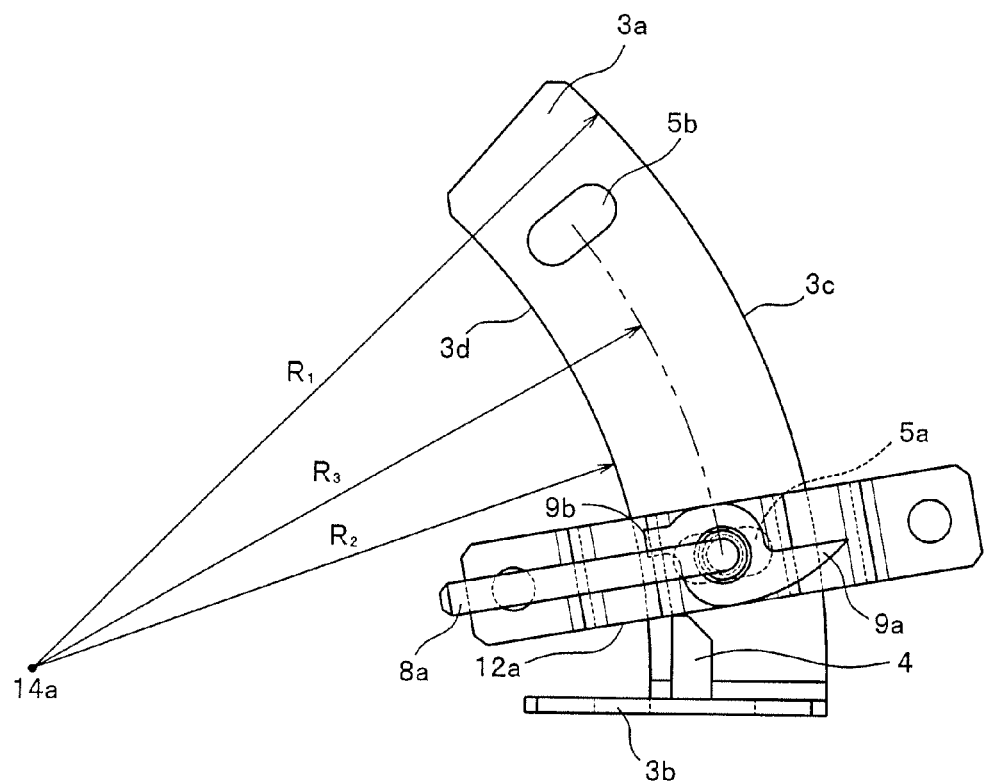
FIG. 9A is a side elevational view showing a positional relation between the engaging member and the actuating member at a position where the driver's cabin is tilted down.
Figure 9B:
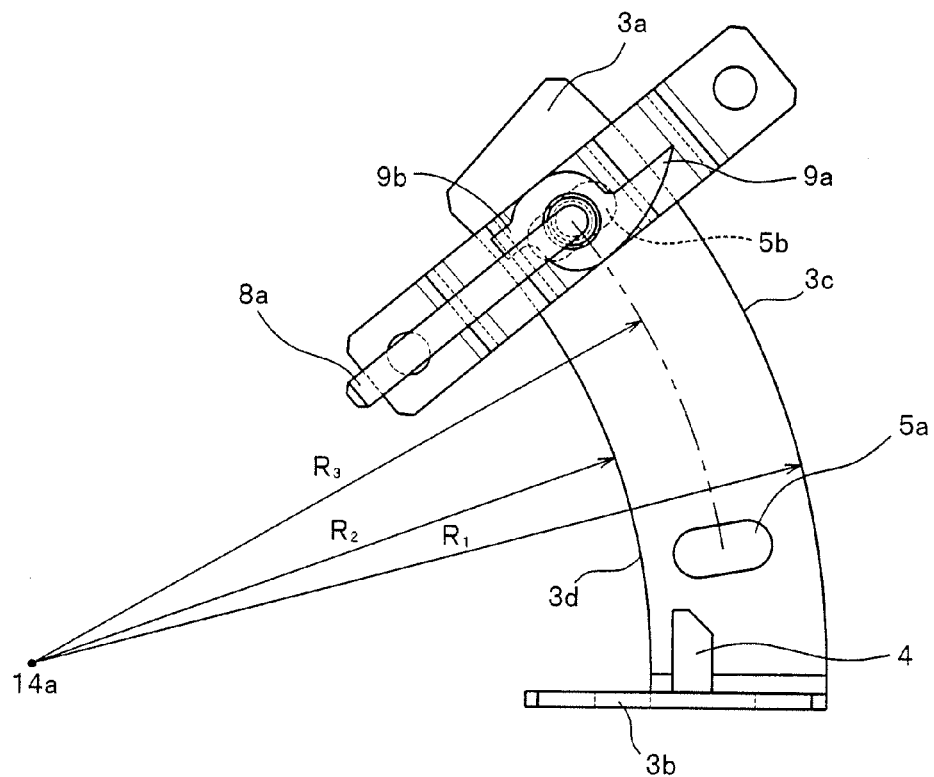
FIG. 9B is a side elevational view showing a positional relation between the engaging member and the actuating member at a position where the driver's cabin is tilted up.
Figure 10A:
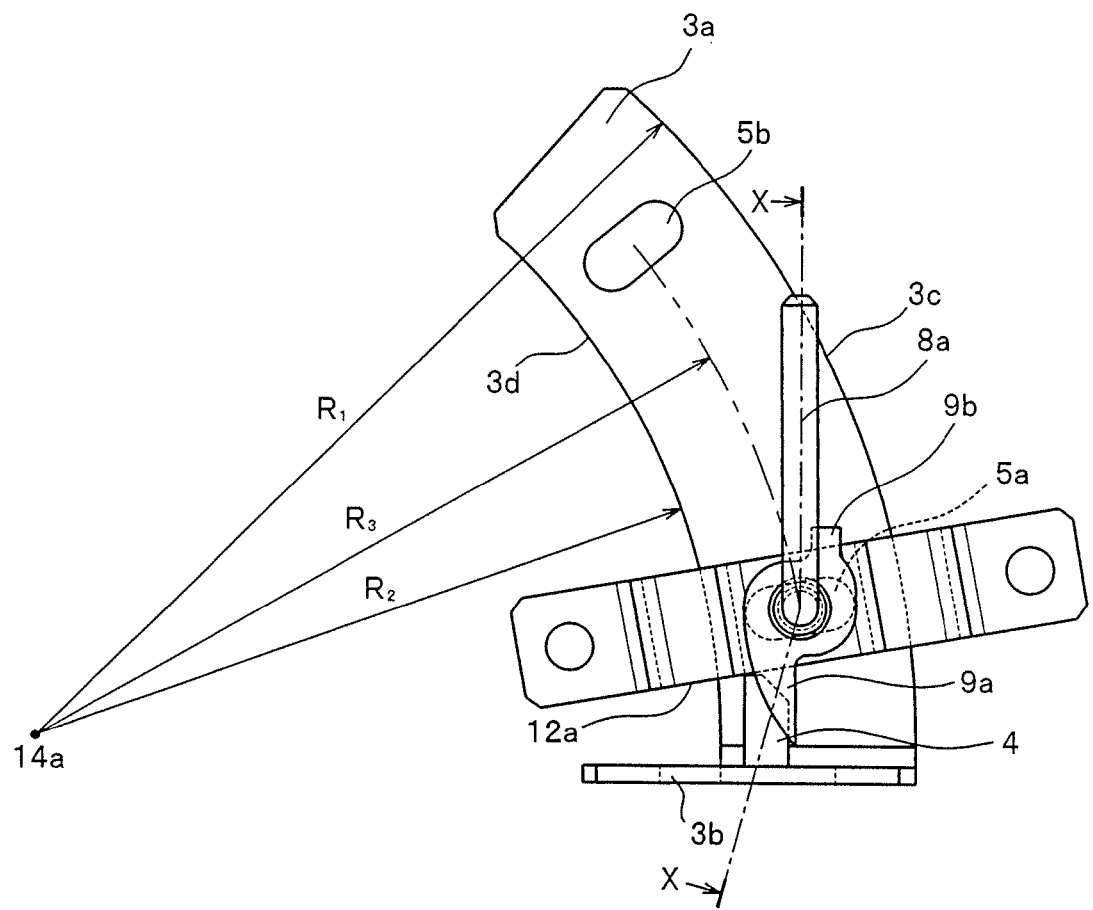
FIG. 10A is a side elevational view showing the state in which a first locking claw of the actuating member is engaged with a stopper piece.
Figure 10B:
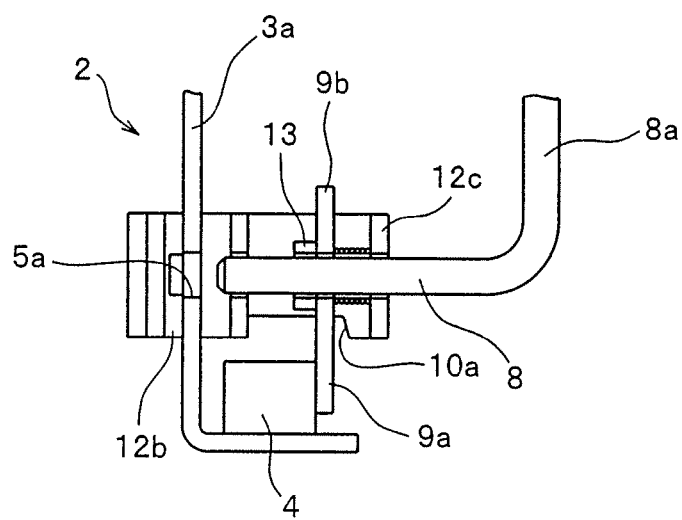
FIG. 10B is a cross-sectional view taken along a line X-X in FIG. 10A.

As shown in FIGS. 3, 9A and 9B, when the engaging member 2 is combined with the actuating member 7, the standing portion 3a of the engaging member 2 can be inserted into a gap formed between the first member 12a and the second member 12b. Further, as shown in FIG. 10B, a stopper piece 4 provided with the engaging member 2 is disposed between the first locking claw 9a and the upper inside surface of the third member 12c at a position approximately as high as the first locking portion 10a.

Figure 8A:
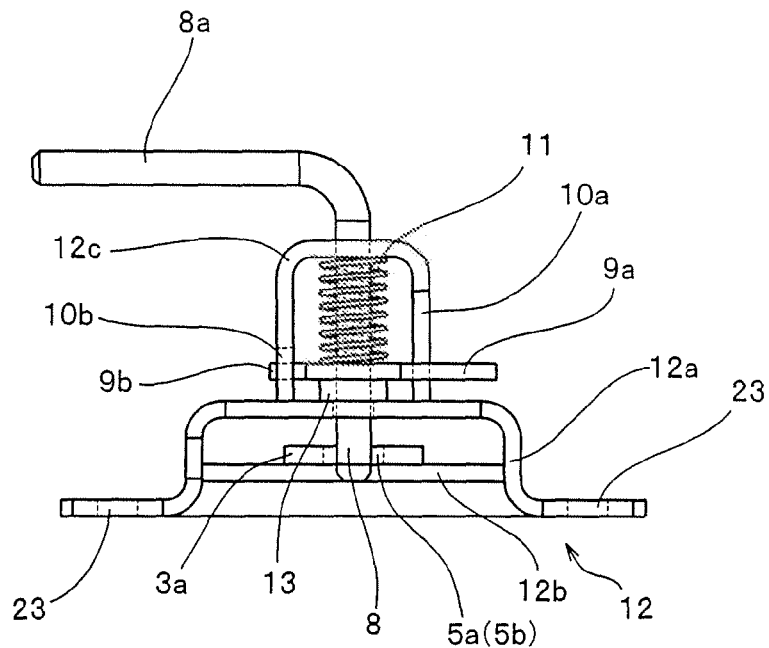
FIG. 8A is a side elevational view showing the state in which a locking pin of an actuating member is inserted into an engaging hole formed in a standing portion of an engaging member.
Figure 8B:
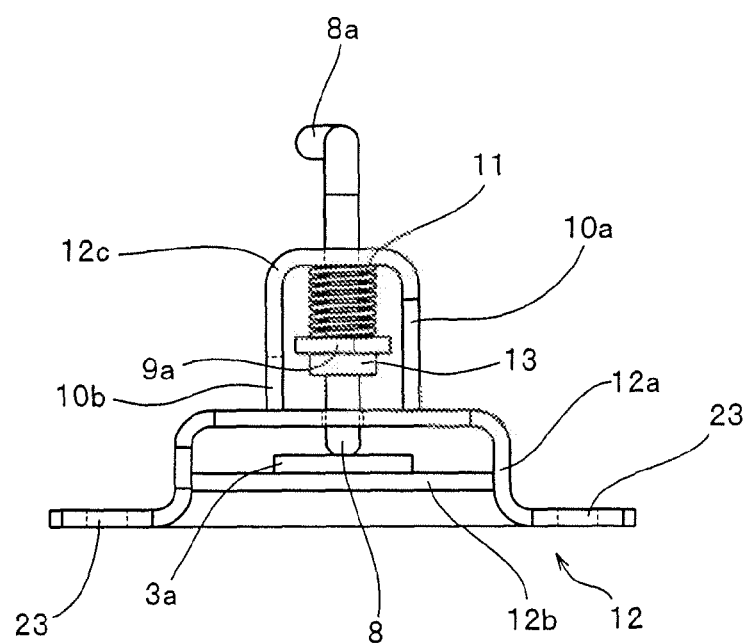
FIG. 8B is a side elevational view showing the state in which the locking pin of the actuating member contacts on and slides on the standing portion of the engaging member.

FIGS. 8A and 8B show the state in which the standing portion 3a of the engaging member 2 is inserted between the first member 12a and the second member 12b. FIG. 8A shows the state in which the locking pin 8 of the actuating member 7 is inserted into the first engaging hole 5a or the second engaging hole 5b formed in the standing portion 3a of the engaging member 2 and the first locking claw 9a is locked by the first locking portion 10a. FIG. 8B shows the state in which a locking state of the first locking claw 9a by the first locking portion 10a is released and the locking pin 8 of the actuating member 7 is not inserted into the first engaging hole 5a or the second engaging hole 5b, but contacts on and slides on the standing portion 3a of the engaging member 2.

The tilt lock structure will be explained appropriately referring to FIGS. 3 to 10B. When the lever 8a is located at a position shown in FIG. 3, the one end of the locking pin 8 passes through the first engaging hole 5a of the standing portion 3a and is inserted into the recessed portion formed to the second member 12b. At the time, as also shown in FIGS. 8A and 9A, the second locking claw 9b is engaged with the second locking portion 10b so that a locked state can be maintained by the locking pin 8 and the first engaging hole 5a of the standing portion 3a.

Note that the example in which the recessed portion is formed to the second member 12b, a through hole may be formed in place of the recessed portion.

When the lever 8a is turned clockwise from the state shown in FIG. 3, the second locking claw 9b is disengaged from the second locking portion 10b. When the lever 8a is pulled up axially against the urging force of the spring 11, the locking pin 8 inserted into the first engaging hole 5a can be released therefrom.

At the same time, when the lever 8a is further turned clockwise from the state, the second locking claw 9b is brought into a contact state with the third member 12c, thereby restricting the rotation of the lever 8a. At this time, as shown in FIGS. 10A and 10B, the first locking claw 9a is engaged with the stopper piece 4 and the engaging state between the actuating member 7 and the engaging member 2 is released.

Then, up to a position where the locking pin 8 moves out of a position enabling an insertion into the first engaging hole 5a according to the tilting-up of the driver's cabin 1, non-engaging state between the actuating member 7 and the engaging member 2 can be maintained by the first locking claw 9a engaged with the stopper piece 4.

Since the actuating member 7 is disengaged from the engaging member 2 in this state, the driver's cabin 1 can be tilted up about the hinge shaft 14. When the driver's cabin 1 is tilted up, lifting/lowering handles 17 disposed right and left of a front opening of the driver's cabin 1 may be used.

While the driver's cabin 1 is being tilted up, the first locking claw 9a, which is in sliding contact with the stopper piece 4, is released therefrom. When the first locking claw 9a is released from the sliding contact with the stopper piece 4, the locking pin 8 is abutted against a surface of the standing portion 3a by the urging force of the spring 11, and the locking pin 8 comes into sliding contact with the surface of the standing portion 3a toward the second engaging hole 5b as the driver's cabin 1 is tilted up. FIG. 8B shows the state in which the locking pin 8 of the actuating member 7 contacts on and slides on the standing portion 3a of the engaging member 2.

When the driver's cabin 1 reaches the tilt up position, as shown in FIGS. 8A and 9B, the locking pin 8 is automatically inserted into the second engaging hole 5b formed to the standing portion 3a. Although the lowering motion of the driver's cabin 1 is prevented even in this state, the lever 8a is turned and the second locking claw 9b is locked to the second locking portion 10b to prevent the locking pin 8 from being pulled axially by any reason, as shown in FIGS. 8A and 9B.

As described above, when the driver's cabin 1 is tilted up after it is released from the locked state, the driver's cabin 1 can be automatically locked at the position to which it is tilted up. Moreover, since the tilt lock structure of the driver's cabin can be disposed in the vicinity of the hinge shaft 14, a worker can easily confirm a tilt locked state at all times.

When the driver's cabin 1 is tilted down from the tilt up position, the second locking claw 9b is unlocked from the second locking portion 10b, and thereafter the lever 8a is pulled up axially and the locking pin 8 is disengaged from the second engaging hole 5b, thereby the driver's cabin 1 can be tilted down.

When the position of the locking pin 8 is separated from the position at which the second engaging hole 5b is formed, as shown in FIG. 8B, the locking pin 8 can be caused to come into sliding contact with the surface of the standing portion 3a. When the driver's cabin 1 is further tilted down up to the tilt down position in the state that the locking pin 8 is in the sliding contact with the surface of the standing portion 3a, the locking pin 8, which is in sliding contact with the surface of the standing portion 3a, is automatically inserted into the first engaging hole 5a formed to the standing portion 3a.

When the second locking claw 9b is locked to the second locking portion 10b by turning the lever 8a after the locking pin 8 is inserted into the first engaging hole 5a, the locked state of the driver's cabin 1 can be maintained at the tilt down position, as shown in FIG. 9A.

As described above, there can be provided the tilt lock structure which can automatically perform the tilt lock regardless that it has the simply structure. In the example explained above, the tilt lock structure is disposed in the vicinity of the hinge shaft in the lower portion of the driver's cabin. However, the tilt lock structure of the present invention may be disposed to a side portion of the driver's cabin.

In the constitution explained above, the engaging member is attached to the vehicle body frame 15, and the actuating member 7 is attached to the driver's cabin frame 16 of the driver's cabin 1. However, the engaging member 2 may be attached to the driver's cabin frame 16, and the actuating member 7 may be attached to the vehicle body frame 15.

In this case, the standing portion 3a may be attached to the driver's cabin frame 16 so that the standing portion 3a is approximately in parallel with a side wall of the driver's cabin frame 16. Then, the flange portion, which has the attachment holes 23 formed to the first member 12a of the actuating member 7, may be disposed to the third member 12c so that the locking pin 8 slides in a direction approximately at a right angle to the side wall of the driver's cabin 16 frame.

Note that a constitution, in which the engaging member 2 is attached to the vehicle body frame 15 side and the actuating member 7 is attached to the driver's cabin frame 16, also belongs to the technical scope of the present invention.

Further, in the constitution explained above, the second locking claw 9b is locked to and unlocked from the second locking portion 10b by manipulating the lever 8a. However, the second locking claw 9b can be automatically engaged with the second locking portion 10b by applying a twist force to the locking pin 8 to turn the second locking claw 9b to the second locking portion 10b side.

Note that the constitution, in which the second locking claw 9b is automatically engaged with the second locking portion 10b, also belongs to the technical scope of the present invention.

The technical idea of the present invention can be applied to an apparatus and the like to which the technical idea of the present invention can be applied.

What is claimed is:

1. A tilt lock structure of a driver's cabin used in a work vehicle, the driver's cabin being tiltable, the tilt lock structure comprising:

an engaging member standing on a vehicle body frame or a driver's cabin frame; and an actuating member fixed to the driver's cabin frame or the vehicle body frame and engaged with the engaging member, wherein the engaging member includes a standing portion which is formed in a concentric fan-shape with respect to a tilt direction of the driver's cabin and has at least one engaging hole formed in the standing portion so as to correspond to a tilt position of the driver's cabin, and a stopper piece, wherein the actuating member includes a locking pin enabling one end to engage with the engaging hole and the other end having a lever, a locking claw fixed to the locking pin, a spring for urging the locking pin to a side of the standing portion, and a locking portion to which and from which the locking claw is locked and unlocked, wherein the locking claw is lockable to and unlockable from the locking portion by axially turning the locking pin in a state that the locking pin is engaged with the engaging hole by an urging strength of the spring, and wherein the locking claw is lockable to and unlockable from the stopper piece by axially turning the locking pin when the locking pin resists the urging strength of the spring and is disengaged from the engaging hole.

2. A tilt lock structure of a driver's cabin used in a work vehicle, the driver's cabin being tiltable, the tilt lock structure comprising:

an engaging member standing on a vehicle body frame or a driver's cabin frame; and an actuating member fixed to the driver's cabin frame or the vehicle body frame and engaged with the engaging member, wherein the engaging member includes a standing portion which is formed in a concentric fan-shape with respect to a tilt direction of the driver's cabin and has a first engaging hole formed in the standing portion so as to correspond to a tilt down position of the driver's cabin and a second engaging hole formed in the standing portion so as to correspond to a tilt up position of the driver's cabin, and a stopper piece, wherein the actuating member includes a locking pin having one end selectively engaged with the first engaging hole or the second engaging hole and the other end having a lever, a locking claw fixed to the locking pin, a spring for urging the locking pin to a side of the standing portion, and a locking portion to which and from which the locking claw is locked and unlocked, wherein the locking claw is lockable to and unlockable from the locking portion by axially turning the locking pin in a state that the locking pin is selectively engaged with the first engaging hole or the second engaging hole by the urging strength of the spring, wherein the stopper piece standing from the same side of a base end portion's side of the standing portion but spaced apart from the standing portion, maintains a tip of the locking pin urged by the strength of the spring to be spaced apart from the standing portion by locking the locking claw of the actuating member, wherein the stopper piece is formed so the locking of the locking claw and the stopper piece is disengaged when the locking pin surpasses an engageable region of the engaging hole formed on the base end portion's side of the standing portion when moving the locking pin which locks the locking claw to the stopper piece along the standing portion; and wherein the locking claw is lockable to and unlockable from the stopper piece by axially turning the locking pin when the locking pin resists the urging strength of the spring and is disengaged from the first engaging hole or the second engaging hole.

3. The tilt lock structure of the driver's cabin according to claim 1, wherein the height of a standing direction of the stopper piece is set so that the locking claw is automatically unlocked from the stopper piece when the driver's cabin tilts a predetermined angle or more.

4. The tilt lock structure of the driver's cabin according to claim 3, wherein the work vehicle is a skid-steer, and the tilt lock structure is disposed at a front lower portion of the driver's cabin.

5. The tilt lock structure of the driver's cabin according to claim 1, wherein the height of a standing direction of the stopper piece is set so that the locking claw is automatically unlocked from the stopper piece when the driver's cabin tilts a predetermined angle or more.

6. The tilt lock structure of the driver's cabin according to claim 5, wherein the work vehicle is a skid-steer, and the tilt lock structure is disposed at a front lower portion of the driver's cabin.

7. The tilt lock structure of the driver's cabin according to claim 2, wherein the height of the standing direction of the stopper piece is set so that the locking claw is automatically unlocked from the stopper piece when the driver's cabin tilts a predetermined angle or more.

8. The tilt lock structure of the driver's cabin according to claim 2, wherein the height of the standing direction of the stopper piece is set so that the locking claw is automatically unlocked from the stopper piece when the driver's cabin tilts a predetermined angle or more.

* * * * *